United States Patent Office 3,594,451
Patented July 20, 1971

3,594,451
CHLOROSULFONATED POLYETHYLENE GRAFT POLYMERS
Robert William Keown, Wilmington, Del., assignor to E. I. du Pont de Nemours and Company, Wilmington, Del.
No Drawing. Filed Oct. 26, 1967, Ser. No. 678,210
Int. Cl. C08f *15/00*
U.S. Cl. 260—878   9 Claims

ABSTRACT OF THE DISCLOSURE

An elastomeric graft polymer of an amorphous, homogeneously chlorosulfonated polyethylene having grafted thereon polymer chain units derived from the monomers styrene, vinyl chloride, chlorostyrene, lower-alkyl substituted styrene, vinylidene chloride, methacrylonitrile, lower-alkyl methacrylates, or a mixture of 2,3-dichlorobutadiene-1,3 and chloroprene, the weight of said polymer chain units being from 10% to 40% (preferably 15% to 30%) of said graft polymer, and said chlorosulfonated polyethylene containing 0.5 to 5 (preferably 1 to 2) weight percent sulfur and 25 to 45 (preferably 28 to 35) weight percent chlorine.

BACKGROUND OF THE INVENTION

This invention relates to graft polymers and, more particularly, to elastomeric graft polymers of chlorosulfonated polyethylene.

Chlorosulfonated polyethylenes are well known to those in the art to be valuable elastomeric materials. They are, however, ordinarily vulcanized to obtain the very desirable elastomeric properties such as high tensile strength and high modulus accompanied by low compression set and low permanent set.

It is also known in the art to polymerize large quantities of vinyl monomers such as styrene in the presence of relatively minor amounts of chlorinated or chlorosulfonated polyethylene thereby forming a graft polymer in which the latter component is present in minor amounts. Such graft polymers are more nearly characterized as plastics exhibiting little elastomeric recovery with undesirably high flow and permanent set under pressure.

SUMMARY OF THE INVENTION

It has unexpectedly been found that elastomeric properties normally associated with vulcanized chlorosulfonated polyethylene are possessed by an elastomeric graft polymer of an amorphous, homogeneously chlorosulfonated polyethylene having grafted thereon polymer chain units derived from the monomers styrene, chlorostyrene, lower-alkyl substituted styrene, vinyl chloride, vinylidene chloride, methacrylonitrile, lower-alkyl methacrylates, or a mixture of 2,3-dichlorobutadiene-1,3 and chloroprene, the weight of said polymer chain units being from about 10% to 40% of said graft polymer and said chlorosulfonated polyethylene containing about 0.5 to 5 weight percent sulfur and about 25 to 45 weight percent chlorine.

DETAILED DESCRIPTION OF THE INVENTION

The chlorosulfonation of polyethylene is well known to those skilled in the art and is described in detail in the U.S. patents to McQueen, 2,212,786; McAlevy, 2,586,363; Strain, 2,646,422; and Heuse, 2,982,759. After chlorosulfonation, the sulfur content should range from about 0.5 to 5 (preferably about 1 to 2) weight percent and the chlorine content should be within the range of about 25 to 45 (preferably 28 to 35) weight percent. The polyethylene should be homogeneously chlorosulfonated (e.g., in solution) and the resulting polymer should have a fairly uniform distribution of substituent groups thereon. Moreover, the product must be amorphous. As used herein the term "polyethylene" should be understood to include not only ethylene homopolymers but polymers of ethylene and small amounts of other ethylenically unsaturated monomers copolymerizable therewith; the molecular weight is at least about 5000. The monomer employed to form the grafted polymer chain units may be styrene, vinyl chloride, vinylidene chloride, or methacrylonitrile. Other monomers include: styrenes wherein the ring is substituted by chlorine (such as o-chlorostyrene or p-chlorostyrene) or lower-alkyl groups (such as 4-tert-butylstyrene or like compounds); and lower-alkyl methacrylates such as methyl methacrylate; however, it is not preferred to use alkyl methacrylates wherein the alkyl group contains more than about 3 carbon atoms. Mixtures of 2,3-dichlorobutadiene-1,3 and chloroprene (2-chlorobutadiene-1,3) can also be used.

In accordance with this invention, it is desirable to graft on sufficient polymer chain units so that they constitute from about 10% to 40% of the total weight of the graft polymer produced. It is generally preferable that the percentage range from about 15 to 30 weight percent of the graft polymer. The preferred range, however, is somewhat dependent upon the chlorine and sulfur content of the chlorosulfonated polyethylene employed. For example, when a chlorosulfonated, branched-chain polyethylene containing about 1.5 weight percent sulfur and 30 weight percent chlorine is employed, the graft polymer produced preferably contains about 15% to 40% grafted polymer chain units. When a chlorosulfonated, branched-chain polyethylene is employed containing about 1% sulfur and about 42% chlorine, the preferred amount of grafted polymer chain units is about 10% to 20% of the weight of the graft polymer. When a chlorosulfonated linear polyethylene containing about 1.5% sulfur and 35% chlorine is employed, the preferred range of grafted polymer chain content is about 15% to 40% of the graft polymer. When the graft copolymer contains less than about 10% of grafted polymer chain units, there is a lack of tensile strength and modulus together with undesirably high compression set; in short, the polymer behaves more like unvulcanized conventional chlorosulfonated polyethylene. When the graft copolymer contains more than about 40% of grafted polymer chains, the polymer behaves more like a plastic exhibiting an undesirable increase in stiffness and flow under pressure with a decrease in elastomeric recovery.

The graft polymers of this invention can be used in many applications where chlorosulfonated polyethylene is usually used in the vulcanized state. Exemplary uses are in extruded goods, cable covers and the like. The exact manner of fabricating such goods would be readily apparent to one skilled in the art.

This invention will now be described in connection with the following examples of specific embodiments thereof wherein parts and percentages are by weight unless otherwise specified.

EXAMPLE 1

A chlorosulfonated polyethylene is selected containing about 29% chlorine and 1.4% sulfur prepared from a low-density, branched-chain polyethylene having a melt index of about 10. The polymer is made into a latex of about 25% solids content in accordance with the teachings of Example VI in Johnson, U.S. Pat. 3,347,810, issued Oct. 17, 1967.

To a 500 ml. flask fitted with a thermometer, mechanical stirrer, heating means, and a reflux condenser, is added enough latex to provide about 35 g. of chlorosulfonated polyethylene solids. The flask is flushed with nitrogen to remove oxygen. The styrene monomer to be grafted is freed of any inhibitors it may contain and added to the latex with stirring. The quantity added is dependent on the composition desired in the final product and is about 10% greater than the amount to be incorporated, the reaction being carried to about 90% conversion. A catalyst such as azobisisobutyronitrile is added with stirring. The concentration of catalyst is about 0.1% based on the monomer being grafted.

The flask and contents are stirred and heated to a temperature suitable for reaction to occur with the monomer being grafted, e.g., about 95° C. for styrene. After holding at this temperature for about four hours, the mass is cooled to room temperature, and the latex graft is poured into a coagulant composed of 85 parts by volume of methanol, 15 parts by volume of $H_2O$ and 0.05 part by weight of $CaCl_2$.

The coagulated product is a white crumb which is washed with methanol and dried in air or in a drying oven. The product is analyzed for chlorine and sulfur. The amount of monomer grafted onto the chlorosulfonated polyethylene is calculated by comparing the analyses of the original chlorosulfonated polyethylene with those of the grafted product.

The product is molded into test strips at 150° C. for about five minutes, cooled in the press and removed and tested at about 23° C. at a rate of about 20 inches per minute for a ¼ inch strip.

cordance with the procedure of Example 1, about 17.5 grams of styrene are employed to obtain a graft polymer wherein about 31% is grafted styrene polymer chains. Upon testing the polymer in the manner described in Example 1, the following typical physical properties are noted:

Modulus at 100% elongation (p.s.i.) _____ 575
Modulus at 200% elongation (p.s.i.) _____ 1650
Tensile strength at break (p.s.i.) _____ 3700
Elongation at break (percent) _____ 360

If, for comparison, this example is repeated except that about 48.6% of the graft polymer is in the form of grafted styrene polymer chains, the modulus at 100% elongation increases by almost fivefold and there is a substantial drop in elongation at break.

EXAMPLE 3

A chlorosulfonated, branched-chain polyethylene containing about 42% chlorine and about 1% sulfur is selected. In accordance with the procedure of Example 1, about 12.8 grams of styrene are employed to produce a graft polymer containing about 24.8% of styrene in the form of grafted polymer chains. The following physical properties are typical:

Tensile strength at break (p.s.i.) _____ 3600
Elongation at break (percent) _____ 235

If, for comparison, a sufficient amount of styrene is employed to increase the percentage to about 58%, the per-

TABLE 1

| | A | B | C | D | E | X[1] | Y[2] |
|---|---|---|---|---|---|---|---|
| Percent styrene in polymer | 13 | 23 | 31.5 | 34 | 40 | 0 | 0 |
| Modulus at 100% elongation (p.s.i.) | 150 | 200 | 220 | 300 | 475 | 75 | 150 |
| Modulus at 400% elongation (p.s.i.) | 400 | 1,050 | 1,200 | 1,900 | | 120 | 1,340 |
| Tensile strength at break (p.s.i.) | 700 | 1,850 | 1,890 | 1,925 | 2,100 | 120 | 1,610 |
| Elongation at break (percent) | 750 | 560 | 540 | 400 | 390 | >1,000 | 420 |
| Permanent set at break (percent) | 55 | 45 | 33 | 45 | 66 | 150 | 10 |

[1] Ungrafted polymer; for purposes of comparison only.
[2] Ungrafted polymer, 100 parts vulcanized for 30 minutes at 150° C. with 4 parts MgO, 3 parts pentaerithritol and 2 parts dipentamethylene thiuram tetrasulfide; for purposes of comparison only.

If, for comparison, one incorporates as much as about 50% of grafted styrene into the graft polymer, the modulus at 100% elongation typically rises rapidly to figures of about 1400 p.s.i. and the permanent set at break also increases to figures greater than 100° it is clear that the elastomeric properties of the material are rapidly diminishing. Note that the properties of graft polymer C in Table I above compare rather well with those of ungrafted but vulcanized polymer Y.

EXAMPLE 2

A chlorosulfonated linear polyethylene containing about 35% chlorine and about 1% sulfur is selected and converted into a latex in accordance with the teachings of Example V of the Johnson U.S. Pat. 3,347,810. In accent elongation at break drops to less than about one third the value noted above.

EXAMPLES 4–9

In the following six examples, the procedure of Example 1 is followed except for differences in the monomer content, the amount of monomer employed in the polymerization, the polymerization time and temperature, percent of added monomer which is converted to graft polymer chains, and the percent of the total weight of the polymer which is grafted polymer chains. Table II below sets forth each of these for the particular example. In addition, it is to be noted that Examples 6 and 7 are conducted in a pressure vessel.

TABLE II

| Example | Monomer | Monomer added, grams | Polymerization Temperature, °C. | Time, hours | Percent Conversion | Grafted |
|---|---|---|---|---|---|---|
| 4 | 0-Chlorostyrene | 16.9 | 95 | 4 | 96 | 32.2 |
| 5 | 4-t-butylstyrene | 12.5 | 95 | 4 | 100 | 26.4 |
| 6 | Vinyl chloride | 17.5 | 60 | 12 | 76 | 25.2 |
| 7 | Vinylidene chloride | 19.5 | 50 | 6.5 | 61 | 22 |
| 8 | Methyl methacrylate | 17.4 | 60 | 3 | 97 | 32 |
| 9 | 85/15 mixture of 2,3-dichlorobutadiene-1,3 and chloroprene. | 23 | 40 | 4 | 65 | 30 |

The physical properties of the graft polymers of these examples are similar to polymer D of Example 1.

The techniques of performing the graft polymerizations are set forth in detail in the above examples. In general, the procedures may differ somewhat for each different monomer employed and for varying amounts of monomer desired to be graft polymerized. Such variations would be apparent to one skilled in the art after a knowledge of the teachings set forth herein.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. An unvulcanized elastomeric graft polymer of an amorphous, homogeneously chlorosulfonated polyethylene having grafted thereon polymer chain units derived from one of the following: the monomers styrene, chlorostyrene, lower-alkyl substituted styrene, vinylidene chloride, methacrylonitrile, lower-alkyl methacrylates, or a mixture of 2,3-dichlorobutadiene-1,3 and chloroprene, the weight of said polymer chain units being from about 10% to 40% of said graft polymer, and said chlorosulfonated polyethylene containing about 0.5 to 5 weight percent sulfur and about 25 to 45 weight percent chlorine.

2. An elastomeric graft polymer as defined in claim 1 wherein the weight percentage of said polymer chain units is from about 15 to 30 weight percent of said graft polymer.

3. An elastomeric graft polymer as defined in claim 1 wherein said chlorosulfonated polyethylene contains about 1 to 2 weight percent sulfur and about 28 to 35 weight percent chlorine, the polyethylene before chlorosulfonation having a molecular weight greater than about 5000.

4. An elastomeric graft polymer as defined in claim 3 having about 15 to 30 weight percent styrene polymer chain units.

5. An elastomeric graft polymer as defined in claim 3 having about 15 to 30 weight percent vinylidene chloride polymer chain units.

6. A elastomeric graft polymer as defined in claim 3 having about 15 to 30 weight percent o-chlorostyrene polymer chain units.

7. An elastomeric graft polymer as defined in claim 3 having about 15 to 30 weight percent 4-tert-butyl styrene polymer chain units.

8. An elastomeric graft polymer as defined in claim 3 having about 15 to 30 weight percent methyl methacrylate polymer chain units.

9. An elastomeric graft polymer as defined in claim 3 having about 15 to 30 weight percent polymer chain units consisting of a mixture of 2,3-dichlorobutadiene-1,3 and chloroprene monomer units.

References Cited
UNITED STATES PATENTS

| | | | |
|---|---|---|---|
| 2,834,749 | 5/1958 | Salyer | 260—30.6 |
| 3,268,623 | 8/1966 | Beer | 260—876 |
| 3,281,345 | 10/1966 | Kuhne | 204—163 |
| 3,322,857 | 5/1967 | Coaker et al. | 260—876 |
| 3,496,251 | 2/1970 | Takahishi et al. | 260—876 |

JOSEPH L. SCHOFER, Primary Examiner

S. M. LEVIN, Assistant Examiner

U.S. Cl. X.R.

260—94.9, 879